United States Patent
Fun et al.

(10) Patent No.: US 9,804,262 B2
(45) Date of Patent: Oct. 31, 2017

(54) RADAR WEATHER DETECTION FOR A WIND TURBINE

(71) Applicant: VESTAS WIND SYSTEMS A/S, Aarhus N (DK)

(72) Inventors: Justin Fun, Singapore (SG); Simon Trist, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 543 days.

(21) Appl. No.: 14/350,621

(22) PCT Filed: Oct. 4, 2012

(86) PCT No.: PCT/DK2012/050378
§ 371 (c)(1),
(2) Date: Apr. 9, 2014

(87) PCT Pub. No.: WO2013/053361
PCT Pub. Date: Apr. 18, 2013

(65) Prior Publication Data
US 2014/0327569 A1 Nov. 6, 2014

Related U.S. Application Data

(60) Provisional application No. 61/545,212, filed on Oct. 10, 2011.

(30) Foreign Application Priority Data

Oct. 10, 2011 (DK) .................. 2011 70565

(51) Int. Cl.
*G01S 13/93* (2006.01)
*G01S 13/95* (2006.01)
*F03D 80/10* (2016.01)

(52) U.S. Cl.
CPC ............ *G01S 13/951* (2013.01); *F03D 80/10* (2016.05); *G01S 13/93* (2013.01); *G01S 13/956* (2013.01);
(Continued)

(58) Field of Classification Search
CPC ...... G01S 13/951; G01S 13/956; G01S 13/93; F03D 80/10; F03D 80/00; Y02E 10/72;
(Continued)

(56) References Cited

U.S. PATENT DOCUMENTS 7,136,011 B2 * 11/2006 Mork .................. G01S 7/003
340/945
7,876,260 B2 * 1/2011 Laufer .................. G01S 7/003
340/945
(Continued)

FOREIGN PATENT DOCUMENTS

DE 202004006595 U1 8/2004
DE 102009059668 A1 6/2011
(Continued)

OTHER PUBLICATIONS

International Search Report for PCT/DK2012/050378, dated Apr. 17, 2013.
Danish Search Report for PA 2011 70565, dated May 3, 2012.

*Primary Examiner* — Matthew M Barker
(74) *Attorney, Agent, or Firm* — Patterson + Sheridan, LLP

(57) ABSTRACT

A radar system for a wind turbine is provided. The radar system comprises a first radar unit (42) and a control unit (41) arranged to receive an output from the radar unit, the control unit comprising a central processing unit. The central processing unit is configured to perform a first function of determining at least one property of aircraft within a monitoring zone in the vicinity of the wind turbine and controlling a warning device to output a warning signal to detected (Continued)

aircraft based on the determined property; and perform a second function of determining at least one parameter of prevailing weather in the vicinity of the wind turbine. A corresponding method is also provided.

22 Claims, 19 Drawing Sheets

(52) U.S. Cl.
CPC ....... *F05B 2260/82* (2013.01); *F05B 2270/32* (2013.01); *F05B 2270/321* (2013.01); *F05B 2270/804* (2013.01); *F05B 2270/805* (2013.01); *Y02E 10/72* (2013.01)

(58) Field of Classification Search
CPC ...... Y02E 10/70–10/74; F05B 2260/82; F05B 2270/804; F05B 2270/321; F05B 2270/805; F05B 2270/32
See application file for complete search history.

(56) References Cited

U.S. PATENT DOCUMENTS

| | | | | |
|---|---|---|---|---|
| 7,948,429 B2 * | 5/2011 | Drake | ..................... | G01S 7/024 342/188 |
| 8,299,640 B2 * | 10/2012 | Pare | ......................... | F03D 1/02 290/44 |
| 8,443,571 B2 * | 5/2013 | Tadayon | ................. | F03D 1/001 52/121 |
| 8,482,435 B2 * | 7/2013 | Wobben | ................. | F03D 80/10 315/149 |
| 8,665,138 B2 * | 3/2014 | Laufer | .................... | G01S 7/003 340/945 |
| 8,860,601 B2 * | 10/2014 | Hol | ......................... | F03D 11/00 342/118 |
| 8,860,604 B2 * | 10/2014 | Oswald | ................ | G01S 13/42 342/107 |
| 8,928,164 B2 * | 1/2015 | Bowyer | ................ | F03D 7/0276 290/44 |
| 9,372,263 B2 * | 6/2016 | Oswald | ................ | G01S 13/42 |
| 2002/0067274 A1 * | 6/2002 | Haller | .................... | F03D 17/00 340/601 |
| 2008/0260531 A1 * | 10/2008 | Stommel | ............... | A01M 29/18 416/31 |
| 2010/0133848 A1 | 6/2010 | Piasecki | | |
| 2011/0084486 A1 | 4/2011 | Yoneda et al. | | |
| 2011/0260907 A1 * | 10/2011 | Roche | ..................... | G01S 7/415 342/27 |
| 2012/0179376 A1 * | 7/2012 | O'Brien | ................. | F03D 7/042 702/3 |
| 2013/0257641 A1 * | 10/2013 | Ronning | ................ | G01S 13/42 342/54 |
| 2015/0159632 A1 * | 6/2015 | Vangen | .................. | F03D 17/00 416/61 |

FOREIGN PATENT DOCUMENTS

| | | |
|---|---|---|
| EP | 1460266 A2 | 9/2004 |
| EP | 1486798 A2 | 12/2004 |
| EP | 2017470 A1 | 1/2009 |
| EP | 2025929 A2 | 2/2009 |
| FR | 2939905 A1 | 6/2010 |
| GB | 2484493 A | 4/2012 |

* cited by examiner

RADOME

FRAMEWORK

RADAR WEATHER DETECTION FOR A WIND TURBINE

FIELD OF THE INVENTION

The present invention relates to wind turbines and systems incorporated therewith to detect properties of moving objects and/or weather.

BACKGROUND OF THE INVENTION

FIG. 1 illustrates a wind turbine 1, comprising a wind turbine tower 2 on which a wind turbine nacelle 3 is mounted. At least one rotor blade 5 is attached to a hub to form the rotor 4. Each blade can rotate about its own longitudinal axis. This is called blade pitching. The hub 6 is connected to the nacelle 3 through a shaft (not shown), preferably being a low speed shaft, extending from the nacelle front. The wind turbine illustrated in FIG. 1 may be a small model intended for domestic or light utility usage, or may be a large model, such as those that are suitable for use in large scale electricity generation on a wind farm. In the latter case, the diameter of the rotor 4 may be as large as 150 meters or more.

The rotor blades of wind turbines are designed to extract power from the wind by virtue of their aerodynamic shape, and subsequent wind induced rotation. For horizontal axis wind turbines, the rotation of the rotor about its axis turns a drive shaft connected in turn to a generator which produces electricity. A low speed drive shaft may be used, coupled to a high speed shaft, or alternatively a direct drive shaft may be used. For horizontal axis wind turbines to operate efficiently and extract the maximum power from the wind, the wind turbine nacelle is rotated to make the rotor face the wind to the greatest extent possible, such that the rotational axis of the rotor is aligned with the wind direction.

Wind turbines, and in particular larger wind turbines, will have a system for rotating the nacelle such that the rotor is oriented to face the wind. These systems are commonly known as yaw systems, or azimuth drives, and allow a wind turbine to continue to extract maximum energy from oncoming winds, despite changes in wind direction. The yaw system is usually located between the wind turbine tower and the nacelle and typically comprises a bearing that is fully rotatable around an axis co-linear with the tower, and one or more electric or hydraulic drives for rotating the bearing relative to the tower. In this way, the nacelle, mounted on the bearing, can be turned through 360 degrees in the horizontal plane.

It can be seen that operating parameters such as the yaw and blade pitch can be adjusted in view of prevailing weather conditions such as wind direction and speed. This may include adjustments to increase or decrease power production, or to reduce strain on the turbine components. This may also include shutting down the turbine, for example by feathering the blades, in response to large gusts or other extreme weather conditions.

Due to the size of modern wind turbines they are susceptible to collision with moving objects such as aircraft. A collision between an aircraft and a wind turbine could clearly result in loss of life and considerable damage to both the aircraft and the wind turbine.

There is a need for a wind turbine featuring a detection system for detecting moving objects such as aircraft, allowing action to be taken in response to the detection. There is also a conflicting need for a wind turbine featuring a detection system to detect weather properties so that appropriate action can be taken.

SUMMARY OF THE INVENTION

The invention is defined in the independent claims for which reference is now directed. Preferred features are set out in the dependent claims.

A first aspect of the invention provides a wind turbine featuring a detection system, such as a radar system, configured to detect moving objects such as aircraft. The radar system is preferably a system of the sort described herein. In addition, a detection system for detecting or determining one or more properties of prevailing weather conditions may also be provided with the object detection system. In particular, the object detection system may be used, or additionally configured, to detect the one or more properties of prevailing weather conditions.

A first embodiment of this aspect may provide a radar system for a wind turbine comprising a first radar unit and a control unit arranged to receive an output from the radar unit. The control unit comprises a central processing unit configured to perform a first function of determining at least one property of aircraft within a monitoring zone in the vicinity of the wind turbine and controlling a warning device to output a warning signal to detected aircraft based on the determined property and perform a second function of determining at least one parameter of prevailing weather, and preferably a wind speed in at least one direction and/or a wind direction, in the vicinity of the wind turbine. The central processing unit is preferably configured to make the determinations based on processing of received radar signals from the radar unit output.

The first radar unit may be configured for the purpose of detecting aircraft within the vicinity of the wind turbine, and is therefore being used to perform an additional function to its primary function.

The radar system may further comprise a second radar unit, the control unit being arranged to receive an output from both radar units. The output of the first radar unit is preferably used by the control unit to perform the first function. The second radar unit is configured to detect at least one parameter of prevailing weather in the vicinity of the wind turbine, the output of the second radar unit being used by the control unit to perform the second function. Preferably the first radar unit operates in the L band and the second radar unit operates in the S or C bands.

The control unit and radar unit may be formed in a single field unit. The entire system may also be incorporated in an integral field unit, being one of a plurality of field units having coverage areas that are in communication to exchange information about aircraft movements within the coverage areas. The radar system is preferably mounted on the turbine tower or nacelle.

The radar system preferably also comprises one or more warning devices coupled to the control unit, the warning devices being one or more of a light emitting device, an audio emitting device or a radio communication device.

The control unit may be coupled to the wind turbine pitch control system, and the control unit may be configured to control the pitch of the wind turbine blades based on the determined property of a detected aircraft. The control unit may also be configured to control the pitch of the wind turbine blades based on the determined parameter according to the second function. In either case, the pitch unit may be controlled to shut down the turbine, preferably by pitching the blades to a feathered position.

The control unit may also, or alternatively, be coupled to the wind turbine yaw control system, the control unit being configured to control the yaw of the wind turbine blades based on the determined property of a detected aircraft and/or the determined parameter according to the second function.

The first function mentioned above may further comprise determining whether the aircraft has a course and height that may result in the aircraft colliding with the wind turbine if the course and height are maintained, with a first warning signal being provided to the aircraft when the aircraft enters a first warning zone within the monitoring zone. A second warning signal may be provided to the aircraft when the aircraft enters a second warning zone within the monitoring zone. Preferably the control unit is configured to provide the first warning signal by controlling a light system and to provide said second warning signal by controlling a radio transmitter system.

The light system may be connected to and controlled by the central processing unit for providing a light warning signal, the light system being activated by the central processing unit upon the detection of the aircraft in the first warning zone. The radio transmitter system may be connected to, and controlled by, the central processing unit for providing a radio frequency audible warning signal, the radio transmitter system being activated by the central processing unit upon the detection of the aircraft in the second warning zone. The light system and radio transmitter system are preferably in a sleep mode until activated by the control unit.

The first function may alternatively, or in addition, further comprise determining whether the aircraft has a course and height that may result in the aircraft colliding with the wind turbine if the course and height are maintained, with a warning signal being provided to the aircraft when it enters a warning zone within the monitor zone, but no new warning signal being provided if the aircraft speed is below a predetermined threshold value and the aircraft is inside the warning zone for longer than a predetermined time.

The system may further include a radar antenna having a plurality of antenna elements in communication with the central processing unit of the control unit, the radar antenna being in communication with radar electronics to form part of the radar system for radar detection of an aircraft in a radar coverage area, wherein the plurality of antenna elements provide 360 degree radar coverage area in the vicinity of the wind turbine.

A corresponding method for operating a radar system for a wind turbine may also be provided. The method comprises providing a first radar unit and a control unit arranged to receive an output from the radar unit, the control unit comprising a central processing unit, and determining at least one property of aircraft within a monitoring zone in the vicinity of the wind turbine based on the output of the first radar unit. A warning device is controlled to output a warning signal to detected aircraft based on the determined property. The method further includes determining at least one parameter of prevailing weather in the vicinity of the wind turbine using the output of the first radar unit.

The first radar unit is preferably configured to detect aircraft within the vicinity of the wind turbine. The parameter of the prevailing weather is preferably a wind speed in at least one direction and/or a wind direction.

Preferably the control unit is coupled to the wind turbine pitch control system and the method further comprises controlling the pitch of the wind turbine blades based on the determined property of a detected aircraft and/or based on the determined parameter of the prevailing weather. Controlling the pitch may preferably include controlling the pitch to shut down the turbine, preferably by pitching the blades to a feathered position.

The control unit may also, or alternatively, be coupled to the wind turbine yaw control system, the method further comprising controlling the yaw of the wind turbine blades based on the determined property of a detected aircraft and/or based on the determined parameter of the prevailing weather.

The method may further comprise determining whether an aircraft in the monitor zone coverage area has a course and height that may result in the aircraft colliding with the wind turbine if the course and height are maintained; calculating first and second warning zones based on the course and height; providing a first warning to the aircraft, when the aircraft enters the first warning zone; and providing a second warning to the aircraft, when the aircraft enters the second warning zone. Alternatively the method may further comprise detecting when an aircraft has entered the monitor zone coverage area; determining information about the aircraft including speed, direction, and height of the aircraft; calculating at least a first warning zone based on the information; providing a first warning to the aircraft, when the aircraft enters the first warning zone; and desisting from providing warnings to the aircraft, when the aircraft remains inside the first warning zone for a predetermined period to time.

Embodiments of a second aspect of the invention provide a wind turbine comprising a first radar unit and a control unit arranged to receive an output from the radar unit. The control unit comprises a central processing unit configured to determine whether the aircraft has a course and height that may result in the aircraft colliding with the wind turbine if the course and height are maintained, wherein a first warning signal is provided to the aircraft when the aircraft enters a first warning zone within the monitoring zone and a second warning signal is provided to the aircraft when the aircraft enters a second warning zone within the monitoring zone.

An alternative embodiment of a second aspect of the invention may provide a wind turbine comprising a first radar unit and a control unit arranged to receive an output from the radar unit. The control unit comprises a central processing unit configured to determine whether the aircraft has a course and height that may result in the aircraft colliding with the wind turbine if the course and height are maintained, wherein a warning signal is provided to the aircraft when the aircraft enters a warning zone within the monitor zone, but no new warning signal will be provided if the aircraft speed is below a predetermined threshold value and is inside the warning zone for longer than a predetermined time.

A third aspect of the present invention provides an improved system for determining one or more properties of prevailing weather conditions using a first detection system, such as a radar detection system, and a second detection system, such as a doppler anemometer and particularly a LIDAR system. Preferably the radar detection system has a longer range to the doppler anemometer and is used to perform an initial scan and detection of prevailing weather condition parameters. The doppler anemometer may then be used to perform a second more detailed measurement of the parameters, the direction in which the Doppler anemometer is pointed being determined by the results of the radar scan. The radar system used is preferably also configured for detecting properties of moving objects such as aircraft but this is not a necessity and it may be configured to detect prevailing weather conditions.

According to an embodiment of the third aspect of the invention a system is provided for determining one or more parameters of prevailing weather in the vicinity of a wind turbine. The system comprises a radar unit; a detector for detecting a component of wind velocity along a line of sight, the detector being mounted in a manner such that the direction of the line of sight can be adjusted; and a control unit arranged to receive an output from the radar unit. The control unit comprises a central processing unit configured to determine at least one parameter of prevailing weather in the vicinity of the wind turbine based on the output from the radar unit; and adjust the direction of the line of sight of the detector based on the at least one determined parameter.

Mounting the detector may involve moveably mounting the detector, for example on a rotating platform or a rotatable mount having an actuator for adjusting the direction of the line of sight, the CPU being configured to adjust the direction of the line of sight of the detector by controlling the actuator. Alternatively, this could be achieved by providing other means of redirecting the detector beam such as providing a moveable or rotating mirror, being moved by an actuator controlled by the CPU.

The control unit is preferably configured to determine the location or bearing from the turbine, of regions of turbulence detected by the radar unit; and adjust the direction of the line of sight of the detector to point the detector at the region of turbulence to detect a component of wind velocity within the region of turbulence.

The detector is preferably a doppler anemometer, and preferably a LIDAR detector, SODAR, RADAR or LDV detector.

The control unit is preferably coupled to the wind turbine pitch control system, the control unit being configured to control the pitch of the wind turbine blades based on the determined at least one parameter of prevailing weather and/or the output from the detector. The pitch unit may be controlled to shut down the turbine, preferably by pitching the blades to a feathered position.

The control unit may also, or alternatively, be coupled to the wind turbine yaw control system, the control unit being configured to control the yaw of the wind turbine blades based on the determined at least one parameter of prevailing weather and/or the output from the detector.

A wind turbine may be provided including the system according to the third aspect of the invention. The system according to the third aspect of the invention may incorporate a radar system of the sort described in relation to the first and second aspects of the invention, including any preferable of optional features.

A corresponding method for determining one or more parameters of prevailing weather in the vicinity of a wind turbine may also be provided, the method comprising: providing a radar unit, a detector for detecting a component of wind velocity along a line of sight, the detector being mounted such that the direction of the line of sight can be adjusted and a control unit arranged to receive an output from the radar unit, the control unit comprising a central processing unit; determining at least one parameter of prevailing weather in the vicinity of the wind turbine based on the output from the radar unit; and adjusting the direction of the line of sight of the detector based on the at least one determined parameter.

Corresponding computer programs may be provided for causing any of the systems described above to perform the method steps described herein.

It should be noted that any aspect of the first, second or third aspects of the invention may be combined with any aspects of the other aspects of the invention, including any optional or preferable features.

BRIEF DESCRIPTION OF THE DRAWINGS

Embodiments of the invention will now be described, by way of example only, and with reference to the accompanying drawings in which.

DETAILED DESCRIPTION OF PREFERRED EMBODIMENTS

Figure 1:
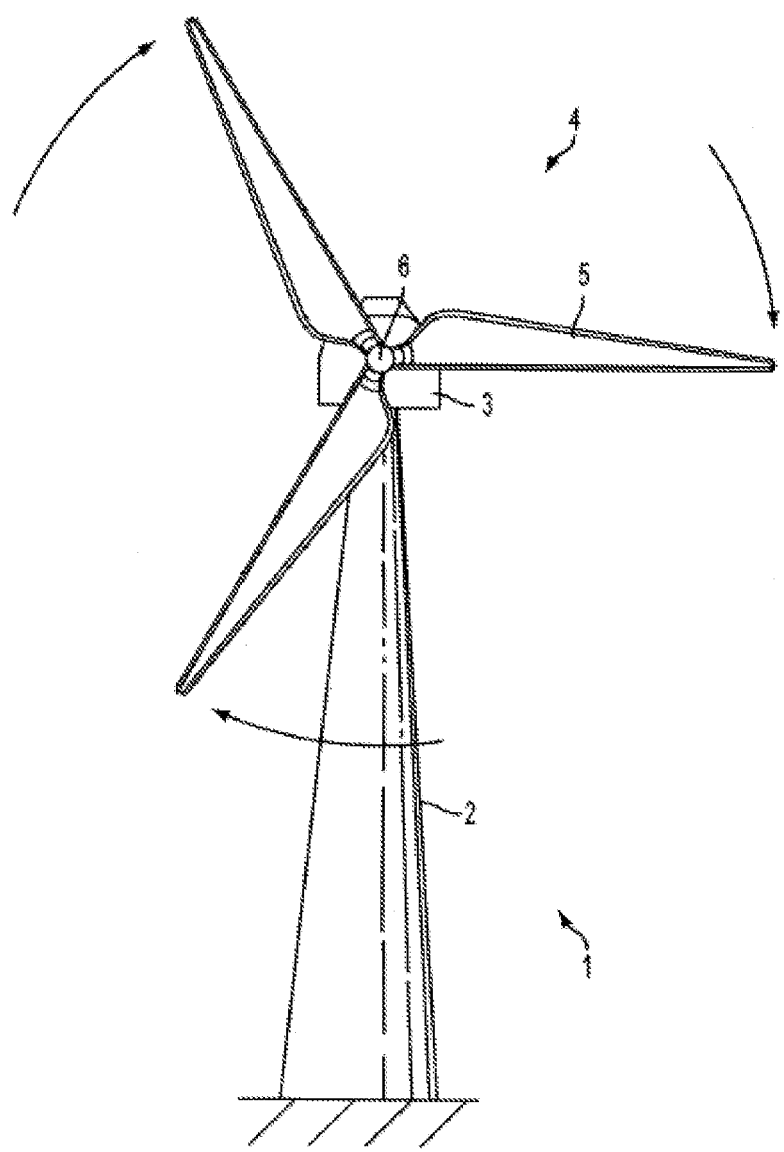
FIG. 1 is a front view of a horizontal axis wind turbine.
Figure 2:
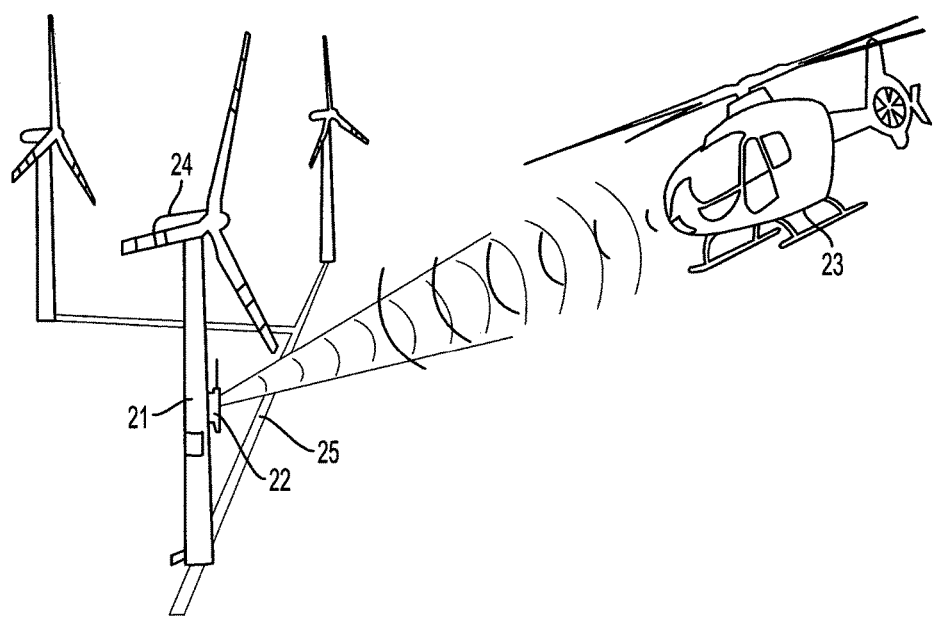
FIG. 2 shows a portion of a wind farm incorporating a radar detection system.

FIG. 2 shows an arrangement according to a first embodiment of the invention. As shown in the figure a wind turbine 21 is equipped with a radar detection unit 22, which is mounted at a position above ground level, preferably on the turbine tower but possibly on the turbine nacelle. The radar detection unit emits radar pulses and detects reflections from objects. In response to detecting an object, one or more actions may be carried out as described below.

Figure 3:
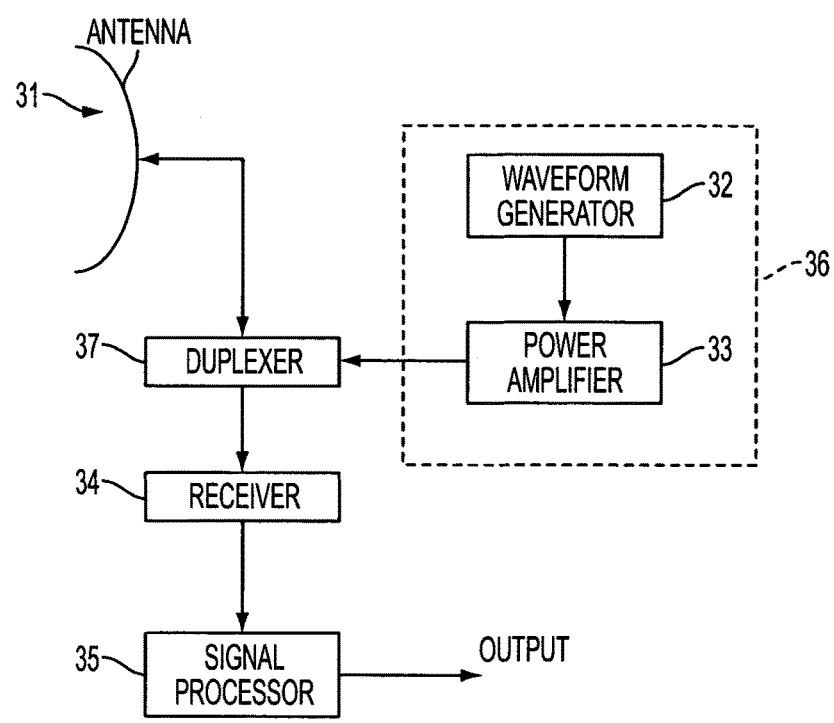
FIG. 3 is a schematic of a typical radar system.

A schematic of an example radar unit is shown in FIG. 3. An antenna 31 is provided to emit electromagnetic waves of a predetermined bandwidth. The radar signal emitted by the radar unit is generated by the waveform generator 32 before being amplified by power amplifier 33. Together these units may be considered an emitter 36. The radar signal reflections, resulting from reflections from objects in the path of the radar signal, are received/collected by the antenna 31 before being passed on to a receiver unit 34 and signal processing unit 35 for subsequent processing to extract information on the reflecting object. A duplexer 37 may be required to prevent damage to the receiver when the high power emitter is being used.

The radar unit is configured to detect moving objects, such as aircraft 23, within the vicinity of the wind turbine 21. The radar unit is configured to detect aircraft or similar objects within predetermined detection regions within the airspace surrounding the wind turbine. Preferably, the radar unit is configured to detect objects at least 50 m-200 m away from the turbine and may be configured to detect objects considerably further away such as several kilometers. The radar unit preferably operates in the L-band.

Upon receiving reflected radar signals the radar unit receiver 34 may perform separation of the desired signal from noise and amplify the signal for subsequent processing. Additional processing, which may be performed by the signal processor 35 may include the rejection of undesired signals, such as clutter, and to pass on signals resulting from desired targets. This processing may be performed in accordance with predetermined parameters in order to detect desired targets.

The output of the radar unit such as the one shown in FIG. 3 can be used to determine properties of a detected object. In particular, the output can be used by a control unit, comprising a central processing unit, to determine the height, coordinates, direction and/or speed or velocity of a detected object. The CPU may then compare one or more of these determined parameters to predetermined threshold values to determine whether these threshold values are exceeded or not met by the determined parameters of the detected object. In response to determining whether one or more parameters of the object exceed or do not meet the predetermined threshold values action can be taken by the control unit as described below.

The threshold values may include one or more of the following parameters. A predetermined distance from the wind turbine may be used, a control action being taken in the event that the object distance is lower than the predetermined distance. In particular, a predetermined height may be used within a predetermined detection area. A predetermined speed may be used, a control action being taken in the event that the object speed exceeds a predetermined speed value. This functionality is preferably employed when the object is determined to be located within a predetermined distance of the wind turbine, or a predetermined area surrounding the wind turbine.

In addition, or alternatively, a heading, course or velocity may be determined by the CPU when the detected object is located within a first predetermined detection area or volume. If the heading determined by the CPU indicates that the object is moving closer to the turbine proximity or towards a second predetermined detection area or volume located within the first predetermined area then one or more control actions are taken.

The area or volume within which the object may need to be in order to initiate one or more of the control actions may be defined by the detection range of the radar unit. Instead, however, the active area or volume within which control actions may be initiated may be based on predetermined parameters provided to the control unit. The area or volume may be, for example, a distance in the horizontal plane of 0 m-200 m and a height of 0 m-200 m, defining a grid or 3D volume within which control actions are taken in response to a detected object.

The control unit responsible for determining the properties of a detected object and whether a control action is required in view of these properties may be located remotely from the wind turbine or may be located at the wind turbine in which case it is preferably provided as part of the radar unit 22. The control unit may be combined with the signal processor of the radar unit. A remote control unit may be used to control and coordinate multiple wind turbines in a wind form as will be described below.

The control actions will now be described. As shown in FIG. 2, the wind turbine is also provided with a warning output device 24. In the example of FIG. 2, the warning output device is in the form of a warning light. Alternatively, an audio output device or radio beacon may be used. The purpose of the warning output device is to output a signal to warn the pilot of a detected aircraft of impeding collision. The warning output device may not need to be located on the wind turbine provided it can warn of the turbine location. However, preferably the warning output device is located on the nacelle of the turbine. A wireless connection may be provided between the control unit and the warning output device to control activation of the warning device.

Figure 4:
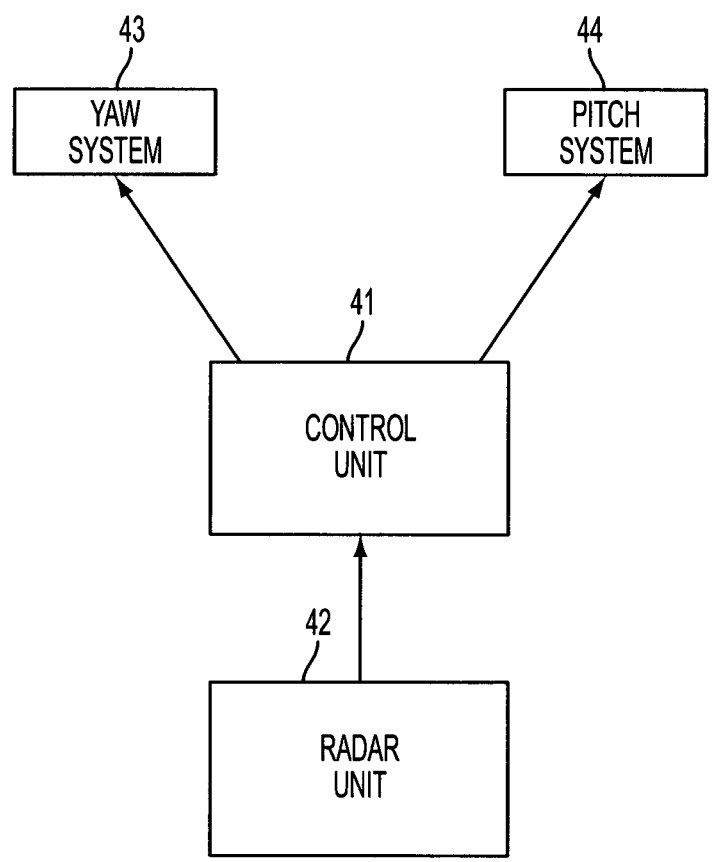
FIG. 4 is a schematic showing the elements of a system according to an embodiment of the invention.

In addition to activating one or more warning output devices, or instead of doing so, the control unit may be configured to control one or more properties of the wind turbine. In particular, the control unit may be configured to adjust the yaw and/or pitch of the wind turbine. FIG. 4 shows how this may be achieved by coupling the control unit 41, which receives the output from radar unit 42, to the yaw and/or pitch systems 43 and 44 which control yaw and pitch operations within the turbine. In response to detecting an object such as an aircraft within a predetermined detection area, or volume, the control unit 41 may send a control signal to the pitch system 44 instructing it to shut down the turbine, for example by feathering the blades. In addition, the control unit 43 may send a control signal to the yaw system instructing the yawing of the turbine out of incoming wind.

As shown in FIG. 2, the system may be extended from a single turbine to incorporate multiple turbines within a wind farm, for example. Each wind turbine may incorporate a radar unit and be coupled to a control unit as described above. The turbines may be coupled to a central control unit, or to one another, by a control network 25 which may be a wired or wireless network.

In addition to the features described above, a wind turbine according to an embodiment of the present invention may include a radar unit, such as those described above or below, configured to detect, in addition to properties of an object such as aircraft, one or more properties of prevailing weather conditions.

Typically, weather detection is performed using S or C band radar, corresponding to a nominal frequency range of 2.0 to 4.0 GHz or 4.0 to 8.0 GHz respectively. L band, corresponding to a nominal frequency range of 1.0 to 2.0 GHz, as may be utilised by the radar unit for detecting aircraft, is not considered appropriate for this use. However it is possible to extract wind direction, speed and other parameters such as divergence and deformation by appropriately configuring the control unit 41 to extract this information from the radar unit 42. One possible example of how this could be achieved, in certain embodiments, is by configuring the CPU of the control unit to perform the velocity-azimuth-display (VAD) technique, which depends on analysis of radial velocity measured during a complete scan in azimuth with elevation angle fixed. At a slant range "r", the diameter of the region scanned is r cos x, and the height of the measurement is r sin x, x being the elevation angle for an azimuth angle β, horizontal wind speed $V_h$, and fall speed of the particles $V_f$, the radial velocity at range r is:

$$V_r(B) = V_h \cos\beta \cos x + V_f \sin x$$

Harmonic analysis can be used to obtain the horizontal wind speed, wind direction and particle fall speed.

Instead of configuring the control unit to extract data, from a single radar signal, to determine both aircraft and wind properties it is possible to provide, within the radar device, a second radar unit configured specifically for the purpose of detecting weather properties and particularly for detecting wind speeds and velocities. The second radar device may include the same features as that shown in, and described in relation to, FIG. 3. Alternatively, one or more components, such as the antenna, emitter, duplexer and in particular the receiver and signal processor, may be shared between the devices. Such a radar device would be configured to emit independent beams, preferably the first being an L band beam to detect aircraft and the second being a C or S band to detect wind and weather properties.

There will now be described a specific example of a system including a radar system, that may be used in an embodiment of the invention described above or below.

The OCAS (obstacle collision avoidance system) which may be implemented in embodiments of the invention is comprised of units which communicate with each other, and which also are arranged to communicate with a centre, for example an OCC=OCAS Control Centre which may be a control unit as described above. The status of OCAS field units can be monitored from an OCC, with reporting to, for example, NOTAM or a Web-page. The warning areas can be reprogrammed from the OCC, and OCAS field units can also be upgraded and have faults rectified therefrom.

Below there follows a short description of the main features of the functioning of the OCAS system. An OCAS field unit comprising a radar unit of the type described above, or an alternative system performing a similar function to it, will typically be placed in the vicinity of the wind turbine of which the OCAS unit is to give warning. One of the said OCAS field units consists primarily of a radar device, a VHF radio, a power source and a mast.

A radar unit which is part of an OCAS according to embodiments of the invention is arranged to have low power consumption, and is constructed to seek continuously in its coverage area for moving aircraft. Upon detection of an aircraft, the radar is arranged to follow the aircraft as a defined target. The course, height and speed of this target are computed and registered in the OCAS field unit or a central control unit. The OCAS field unit, or central control unit, is provided with a device that follows the registered course, height and speed, and is arranged to activate a warning device to enable the pilot to manoeuvre safely away from the aerial obstacle if the target's course, height and speed are of such character that there is a danger of collision with the aerial obstacle.

The VHF radio of an OCAS field unit, which may be an integral part of a system incorporated into embodiments of the invention, permits the remote control of the warning signals including warning lights, audio warning signals and communication within a network of OCAS field units.

The OCAS field unit is designed for low power consumption, and may preferably be supplied with power from batteries and/or solar panels. This mode of power supply renders the field unit self-sufficient in energy and independent of power supply from a mains network. Alternatively, the OCAS field unit may be powered by energy derived from a wind turbine to which it is attached. As a supplement to the power supply from batteries and solar panels, the OCAS field unit may be provided with a power supply unit or a connection for the mains network, which permits operation even if batteries, wind, or solar panels should not be capable of supplying the necessary electric power. A power supply solution of this kind will advantageously give low running costs and simplified installation and operation in remote, accessible locations.

An OCAS field unit will typically be mounted on the turbine tower or nacelle by a mounting arrangement. The mounting device, which may be part of an OCAS, is flexibly constructed of modules to facilitate transport. Thus it is simple to assemble and construct, along the rest of the OCAS field units, to be resistant to harsh climatic conditions.

An OCAS according to the invention has a number of operating modes, of which one keeps the actual radar unit in operation to continuously monitor the radar's coverage area, whilst the other parts of the system "sleep". With the radar in operating mode, this coverage area is defined by two warning zones. The two warning zones are, preferably, a warning zone for a first warning signal, such as a light signal and a warning zone for a second warning signal, such as an audio signal. In the case of aircraft that are detected in the light signal warning zone, an OCAS system according to the invention activates a light signal mounted on or close to the wind turbine to aid the aircraft operator's or pilot's visual detection of the obstacle situation. If, despite the light signal warning in the first warning zone, the aircraft does not make any evasive manoeuvre, but continues its journey into the second warning zone, an acoustic signal that is given via a VHF radio is activated. The audible warning signal given via the VHF radio is characteristic, distinctive and easy to recognise, and is transmitted on all relevant VHF frequencies to aircraft within the VHF radio's range. A VHF radio, or a radio operating on other frequency bands, and which is a part of an OCAS incorporated into the embodiments of the invention, is provided with a programming device so that some frequencies can be defined so as not to carry the sound warning.

Figure 5:
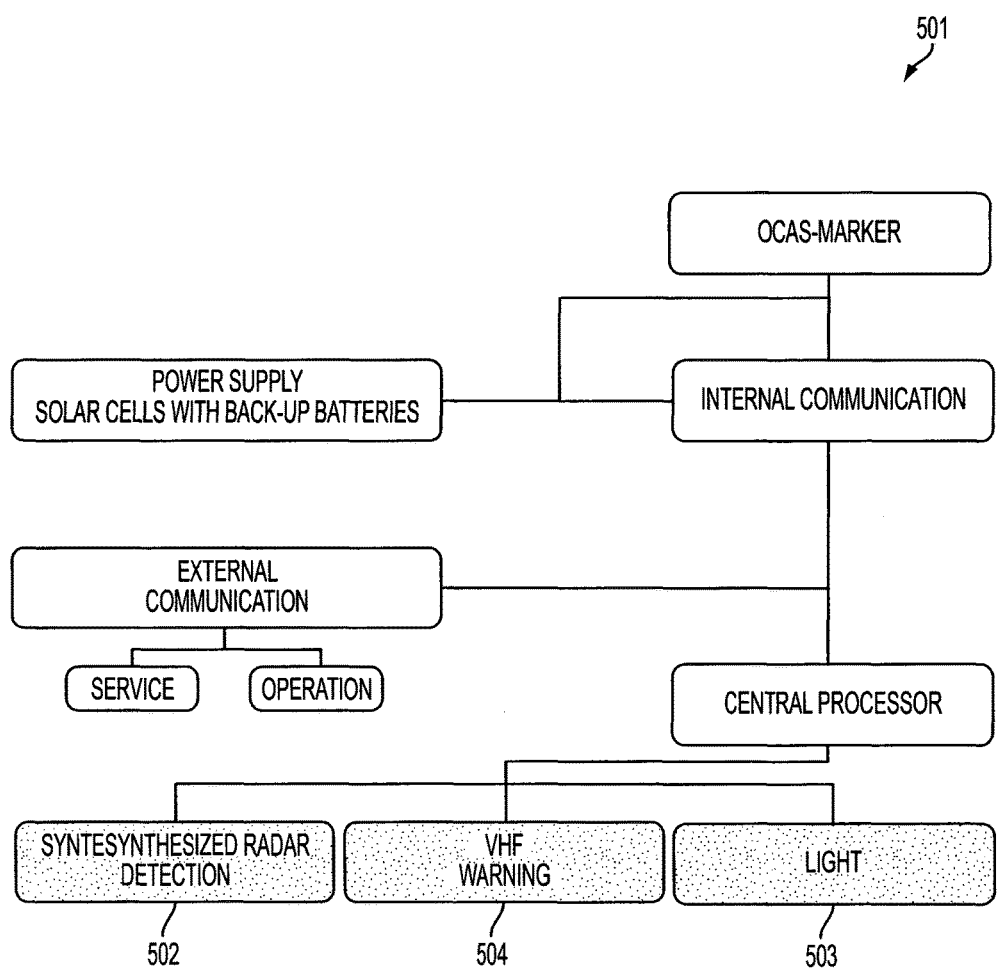
FIG. 5 is a structure chart showing the main elements of an OCAS system.

FIG. 5 shows an OCAS or OCAS marker 501 schematic showing the main elements thereof. A radar device 502 in an OCAS system according to the invention includes a radar signal processor, as described above. The signal processor may determine whether a detected object is within the defined detection area, and within the defined warning zones. Alternatively, the control unit may receive the output from the signal processor and perform this function. Detection areas and warning zones are defined through the programming of the processing unit and by the actual coverage area of the radar and are limited in the vertical plane. Typically, such a limitation in the vertical plane for the OCAS will be defined so that objects, or targets, which are, or will come, at a height of less than 50 meters above the highest point of the associated wind turbine trigger a warning.

Figure 6:
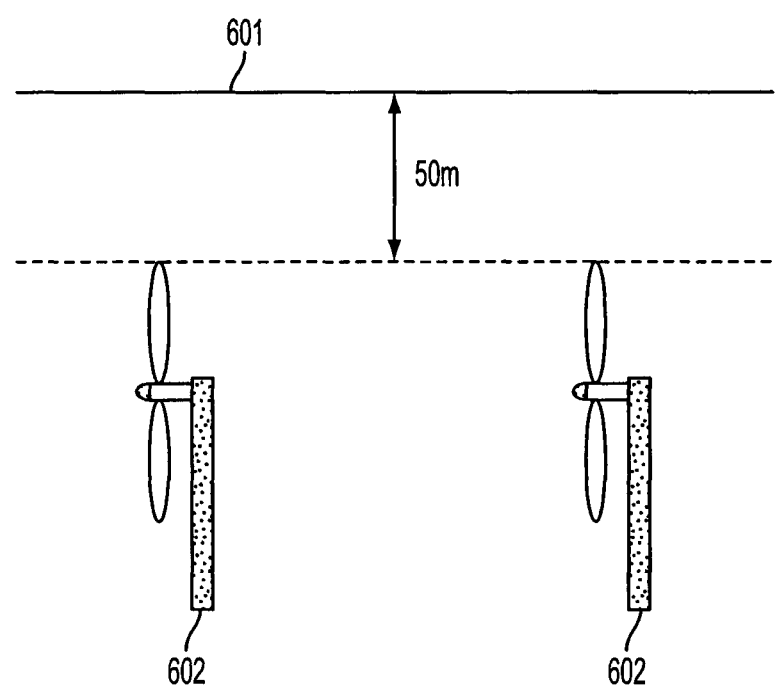
FIG. 6 is a schematic illustration of an example of the determining of a vertical warning boundary for an OCAS system.

FIG. 6 shows an illustration of an example of the determination of a vertical warning boundary for an OCAS. As can be seen from the figure, the warning boundary 601 is determined as a predetermined distance from the highest point of the wind turbines 602, being the highest point reached during use by the motor blades. The vertical warning boundary may, as shown in FIG. 6, be 50 meters above the highest point of the wind turbine for example.

Figure 7:
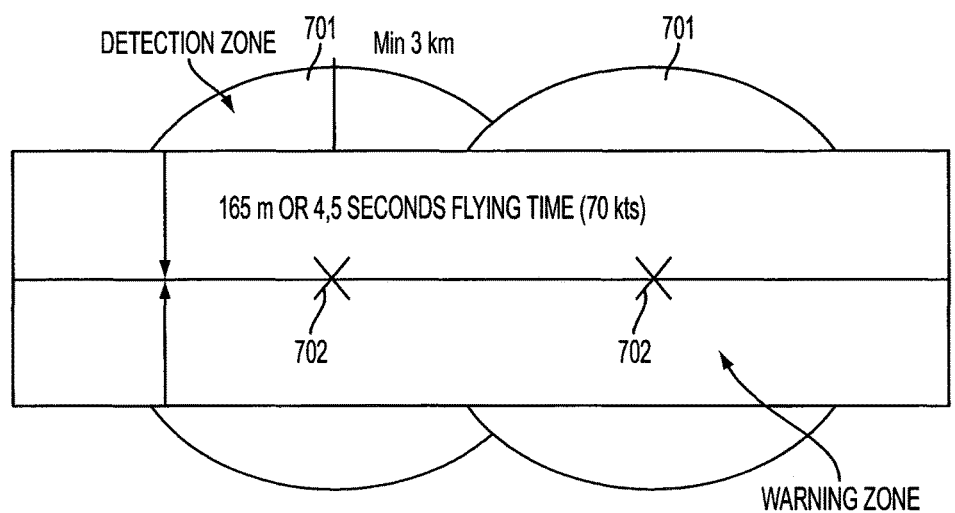
FIG. 7 is a schematic illustration of an example of detection and warning zones in an example of the utilisation of an OCAS system to warn of a wind turbine for aircraft travelling at a speed of less than 200 knots.

FIG. 7 shows a top down view of an example detection zone arrangement in which the detection zones 701 are distributed around multiple wind turbines 702, and arranged to warn aircrafts travelling at a speed of less than 200 knots of wind turbines in the vicinity.

Figure 8:
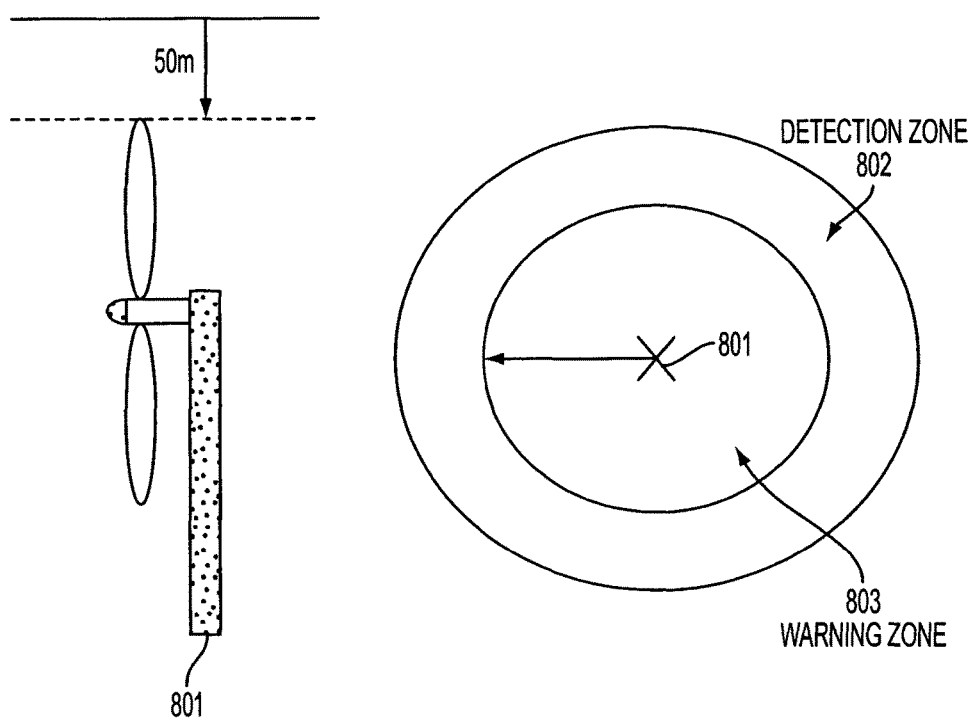
FIG. 8 is a schematic illustration of an example of detection of warning zones in an example of the utilisation of an OCAS system.

FIG. 8 shows both the vertical direction warning zone position, in a similar manner to FIG. 6, as well as a top down view of the detection zone for the wind turbine 801. As can be seen from FIG. 8, a detection zone or monitoring zone 802 is provided extending around, or encompassing, a warning zone 803. The radius of the detection zone may depend on the type of radar system being used, but preferably may be around 3000 meters. The radius of the warning zone can be adjusted depending upon the velocity of the aircraft being considered. For velocities of under 200 knots a warning zone of 165 meters, or 4.5 second flying time, may, as an example, be sufficient. For higher velocity aircraft of above 200 knots a warning zone of 1000 meters, which may also correspond to 4.5 seconds of flying time may also be used.

The radar system in the OCAS is arranged to determine whether a target has a course and height that may result in the target colliding with the wind turbine if the identified course and height are maintained. If the target's course and height are of such a character, the light warning will be activated when the target is in the first warning zone. The warning zone will thus be partly defined by means of the target's speed and direction, and is given an area in accordance with these factors in order to activate a warning in good time before a potential collision happens. The warning time is thus calculated to help the pilot see the wind turbine and manoeuvre away from it to avoid collision.

A light warning 503 may, for example, be a stroboscopic light which flashes about 40 times per minute and may begin 15 seconds before collision or some other predetermined time.

An acoustic warning via a VHF radio 504 may typically be a signal that is transmitted with a duration of 5.5 seconds, and which is received on the radio on board the flying object that is on a collision course and alerts the aviator to the fact that he is in the vicinity of the wind turbine.

An OCAS according to the invention may also be provided with a device for following a target that is detected within the radar's range, and for following the target with a warning when the target enters a warning zone, but then desisting from giving new warnings if the target is slow-moving and is inside the warning zone for a long time. This is advantageous, for example, if it is necessary to carry out work on or in the immediate vicinity of an aerial obstacle, such as a power line, using a helicopter or other slow-moving aircraft. In such a case, the warning will be given in the usual way when the aircraft first enters the warning zone, but new warnings will not be given as long as the aircraft is inside the warning zone. Should the aircraft leave the warning zone and then re-enter it, a new warning, either a light or audio warning, will be activated as before.

An OCAS may include several OCAS field units preferably each mounted on, or associated with, a respective wind turbine. The OCAS field units may be provided with means of communication for communicating with each other, and can exchange information relating to a target detected within the field unit's range.

Figure 9:
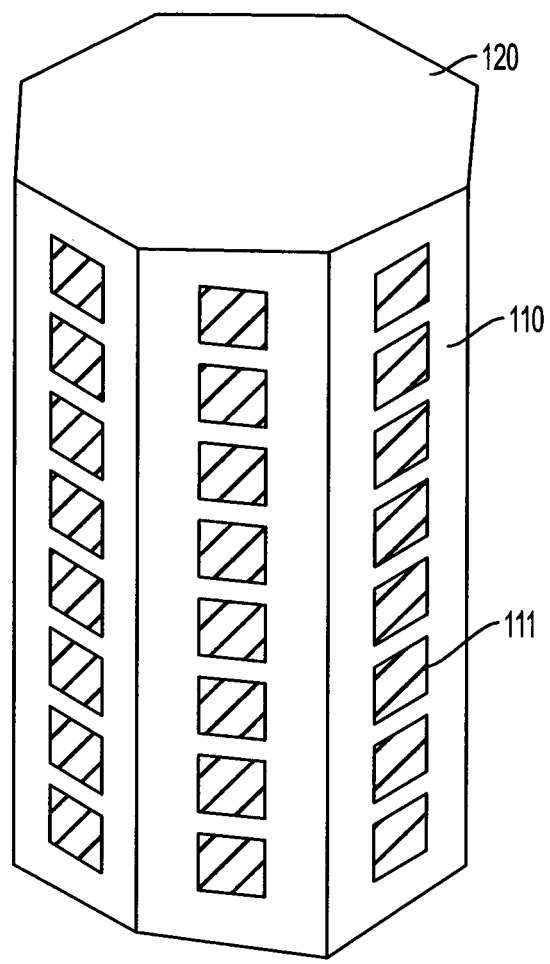
FIG. 9 shows an antenna configuration for a radar in an OCAS system.

FIG. 9 shows an example of an embodiment of a preferred antenna solution for an OCAS radar antenna having eight antenna panels arranged as the sides of an octagon. During operation, the octagonal antenna 320 will be so positioned that each antenna panel 310 is arranged vertically with a "field of view" that exceeds ⅛th of the circumference, and due to an overlapping with adjacent panels, the assembly of eight panels will give a 360 degree coverage. Each antenna panel comprises a plurality of antenna elements 311 which are selected according to frequency, vertical coverage requirements etc.

Figure 10:
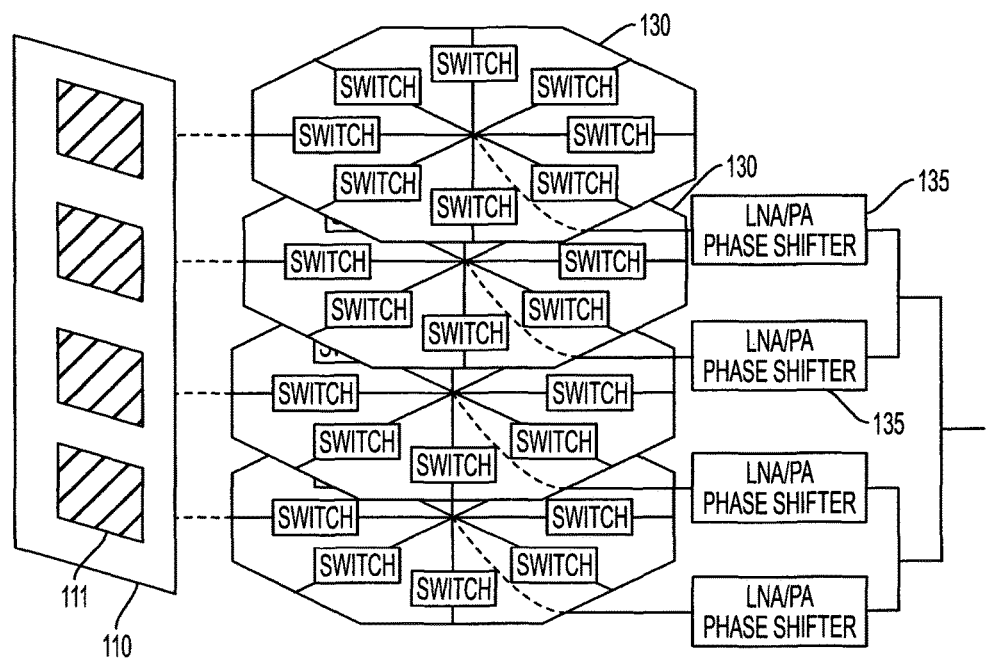
FIG. 10 shows a more detailed schematic diagram of a radar antenna as shown in FIG. 9.
Figure 11:
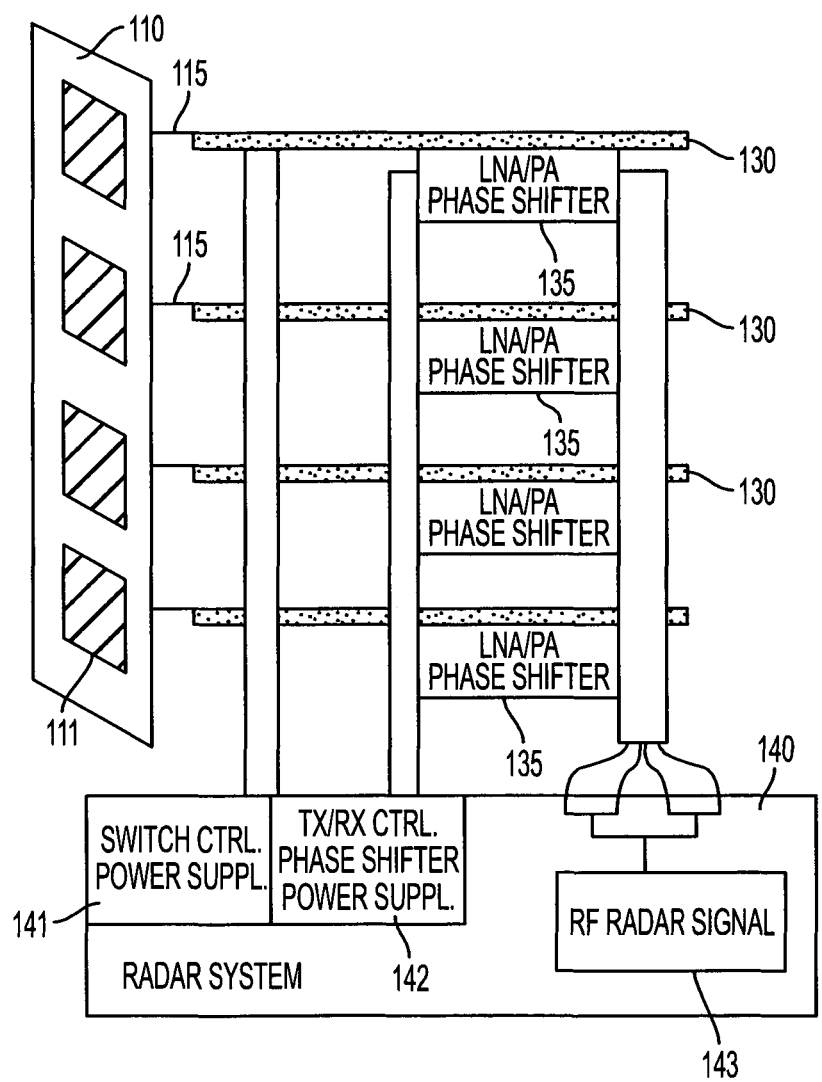
FIG. 11 shows a more detailed schematic diagram of an antenna structure as shown in FIG. 9 with the addition of controlling signal generation electronics.
Figure 12:
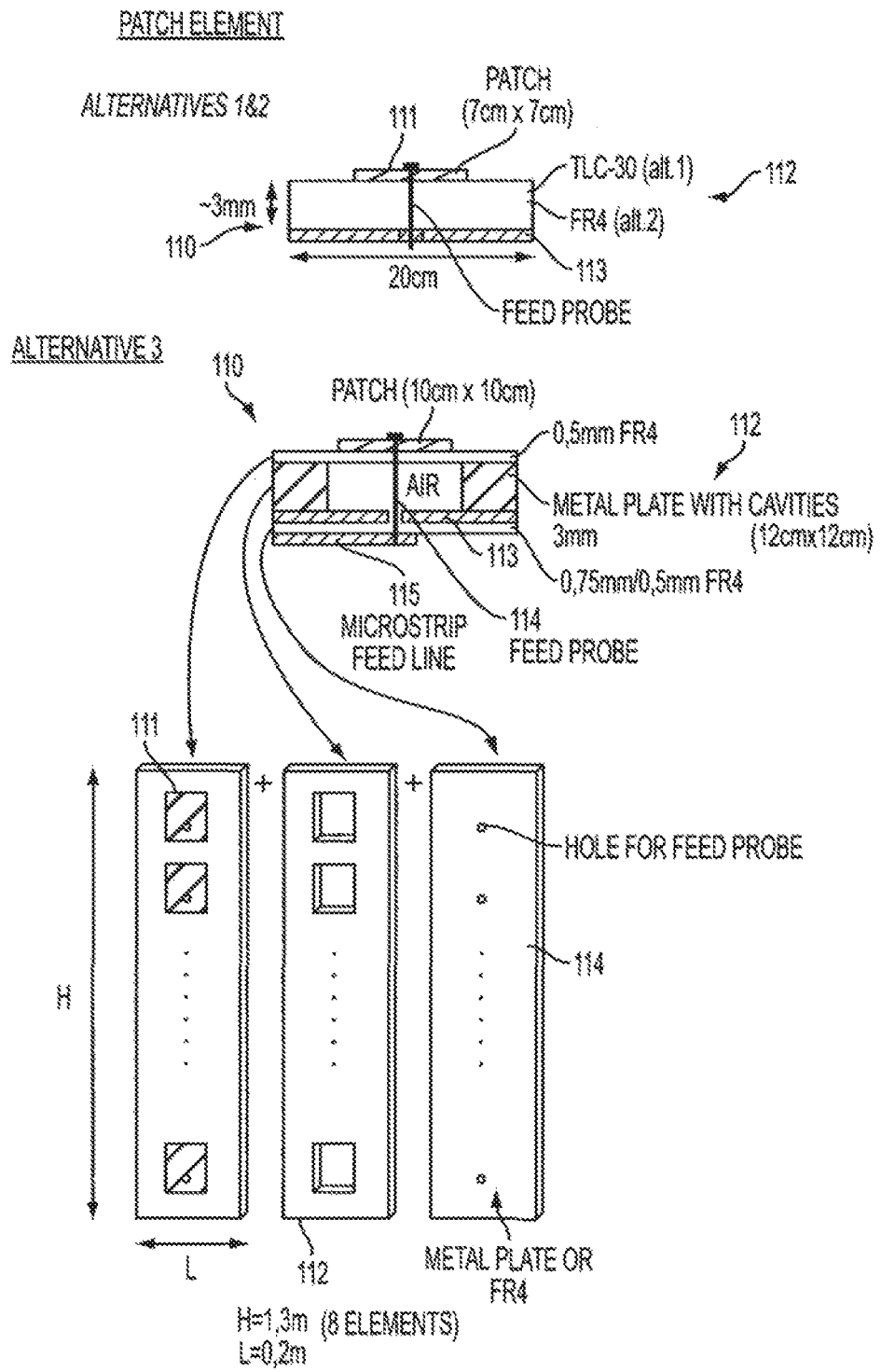
FIG. 12 shows a schematic illustration of examples of antenna panel designs for an antenna architecture as shown in FIG. 9 or 10.
Figure 13:
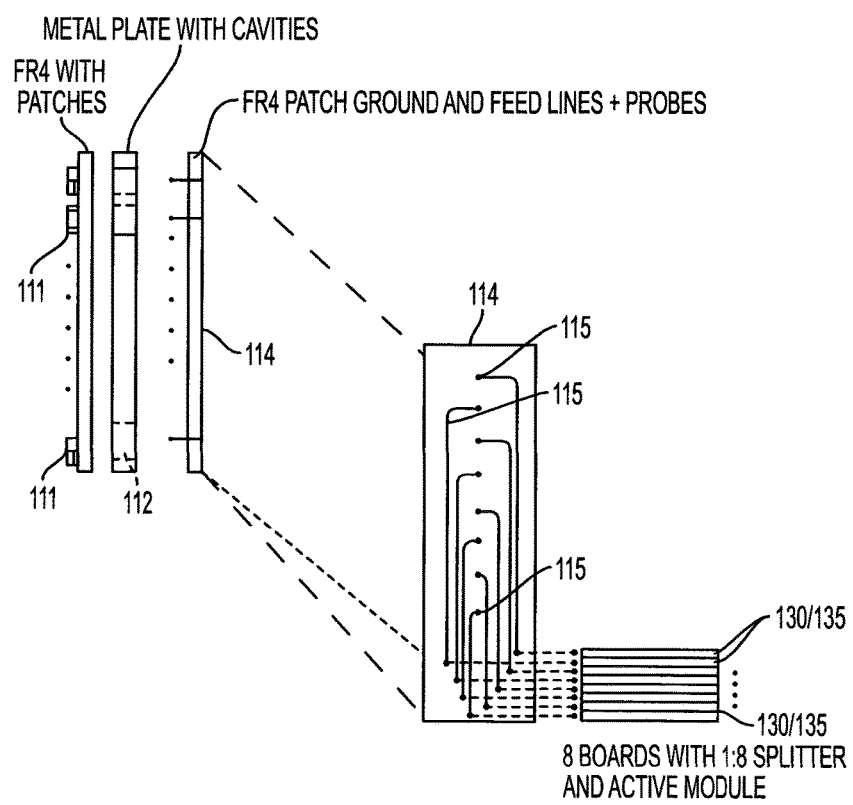
FIG. 13 shows a schematic illustration of an example of a feed network for antenna panel designs for an antenna architecture such as the one shown in FIGS. 9 and 10.
Figure 14:
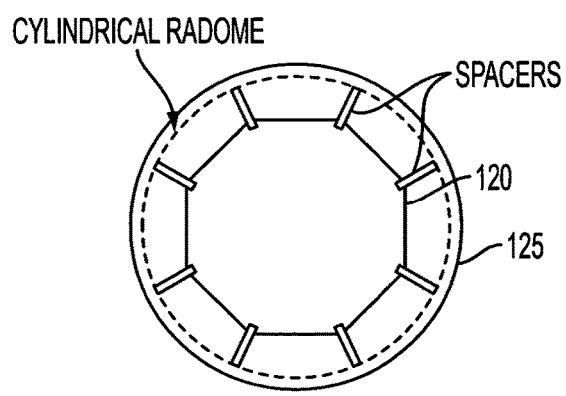
FIG. 14 is a schematic illustration of an almost cylindrical support frame and radome for an antenna architecture as shown in FIG. 9, 10 or 11 with a mounting suggestion for a favourable positioning of a non-direction VHF antenna.
Figure 14:
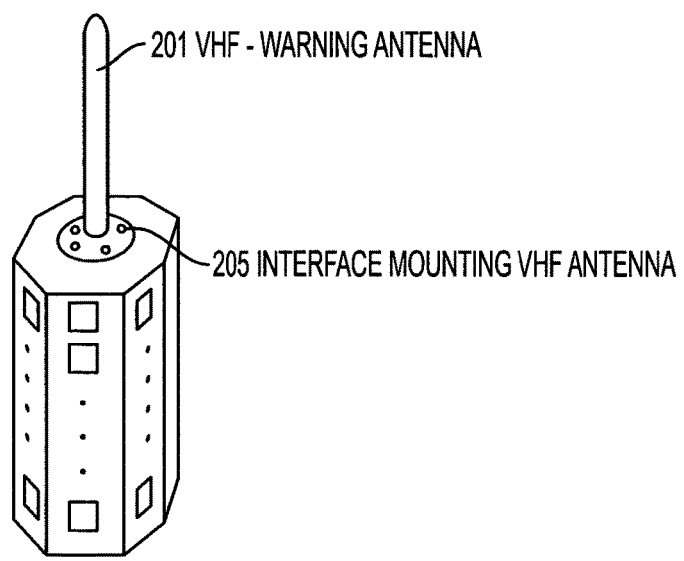

FIG. 10 is a schematic diagram of the architecture shown in FIG. 8, but with fewer antenna elements 311, where it is illustrated how the signals are carried to/from the antenna elements 111, through a combination of pin-diode switches and a radial splitter 130, and active modules 135 which comprise a low noise amplifier LNA, a power amplifier PA and a phase shifter, and also a network for combining the signals into one signal that is passed on to the actual radar system unit 140 containing radar signal generator and receiver 143, a unit for switch control and switch power supply 141 and a unit for TX/RX control and phase shift control with power supply 142, as indicated in more detail in FIG. 11. Alternatives for the design of an antenna element 110 are shown in FIG. 14. In alternative 1 the antenna panel is made of an elongate structure consisting of a reference plane 113, a dielectric layer 112 and a plurality of element areas 111. Antenna feed is carried out by the feed probe 114 which is passed through an opening in the reference plane 113, optionally, as shown for alternative 3, with connection to a feed line network laid on a dielectric layer placed on the reference plane on the side of the reference plane that is opposite to the position of the antenna element. A panel with a group of antenna elements is also shown in the lower part of FIG. 12, where a group antenna is outlined with a total of eight elements, of which the two uppermost and the lowermost are shown. A further detail of a layered structure as shown in FIG. 12 is shown in part by a split drawing in FIG. 13, where the split-up structure of the panel is shown in a side view, as an illustration of a possible feed network made in the form of a printed circuit on a circuit board which bears the reference plane on one side and the feed network on the opposite side. The conductor structure of the feed network is shown indicated by the reference numeral 115. The reference numerals 130/135 indicate, respectively, modules containing pin diode switches and radial splitter and active modules containing LNA, PA and phase shifter.

Details of a mechanical construction in an assembled antenna system which is suitable for the invention is shown in FIG. 14, including as shown in FIG. 9, a constellation of eight antenna panels arranged cylindrically in an octagonal cross-section, where the antenna panels are mounted on an octagonal framework with centrally located interface 205 at one end with mechanical fixing means for a VHF antenna 201. In the upper part of FIG. 14, indicated in sketch 4, it is shown how a cylindrical radome 125 can be placed over the octagonal framework to provide environmental protection of the antenna panels.

Figure 15:
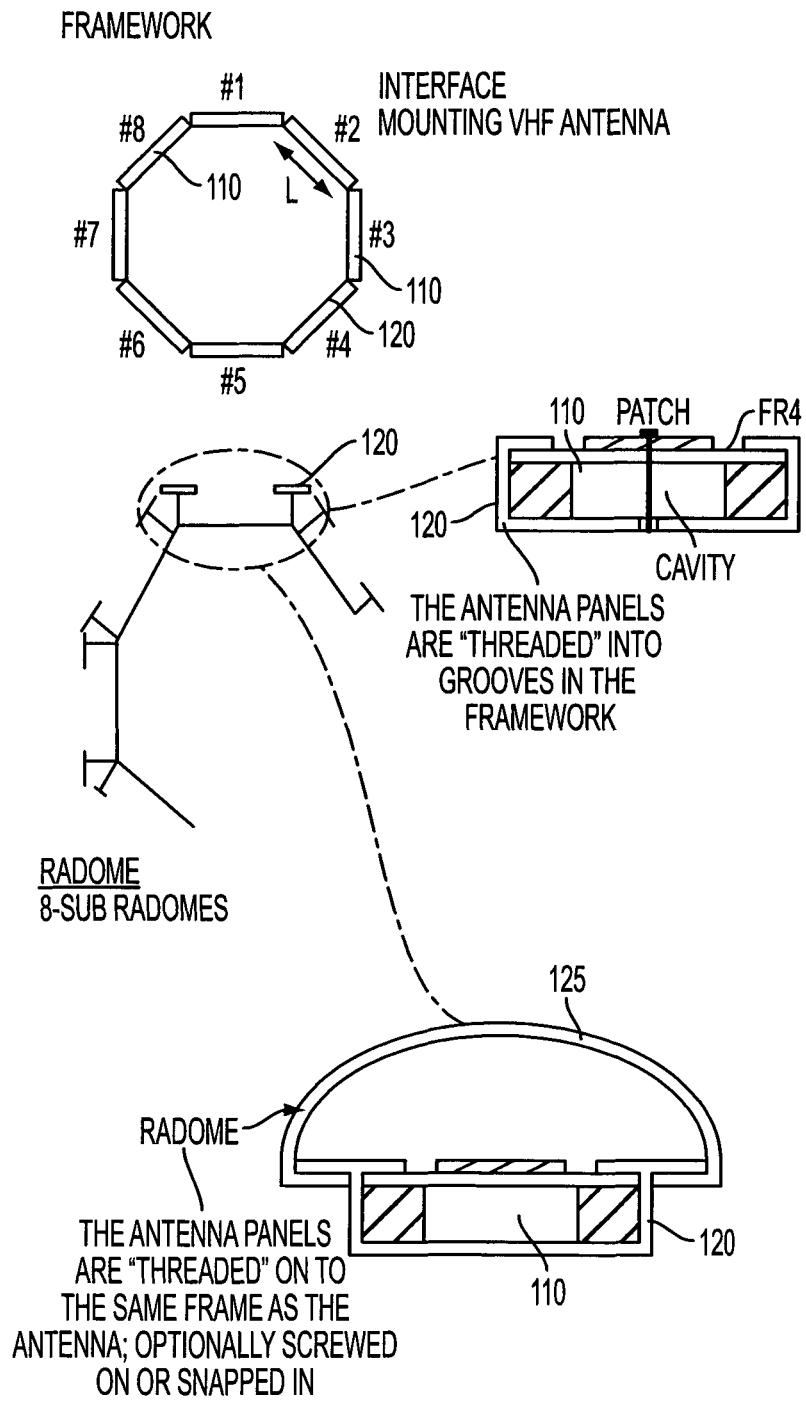
FIG. 15 is a schematic illustration of more details of the support frame in an antenna architecture as shown in FIG. 9, 10, 11 or 14 where each individual antenna panel is covered by a panel radome of an OCAS system.
Figure 17:
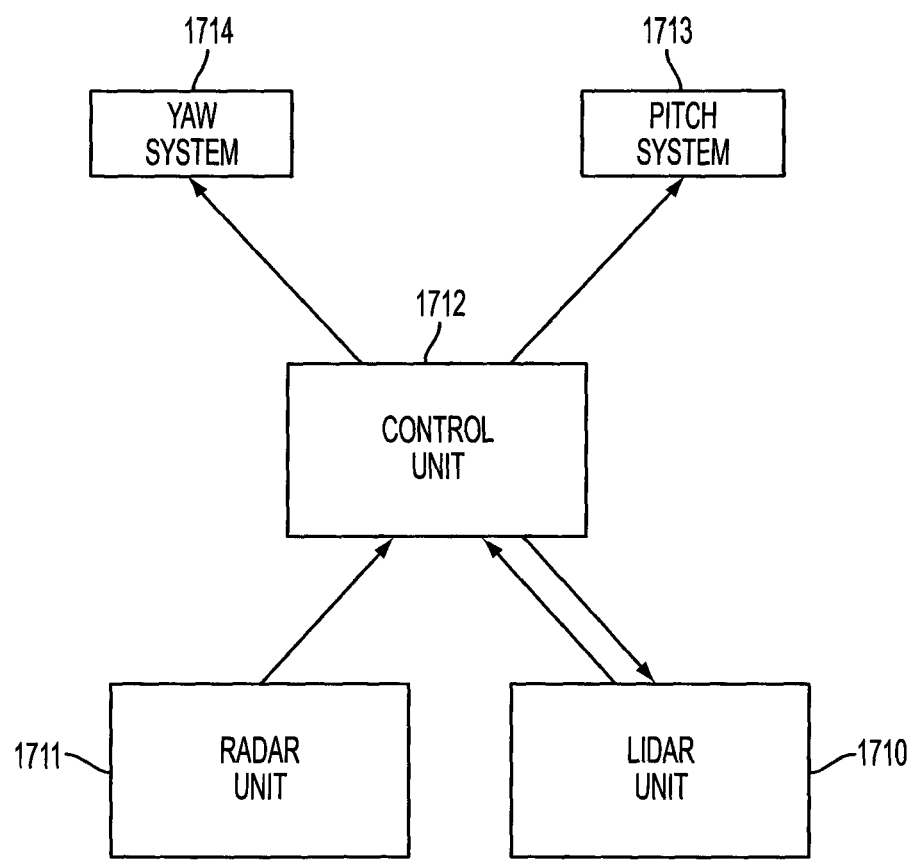
FIG. 17 is a schematic of a control system for controlling the yaw and pitch of a wind turbine.

The framework construction is shown in more detail in FIG. 15, with the framework 120, and a possible arrangement of an antenna panel 110 in a respective longitudinal slot in the frame structure, and at the bottom of FIG. 17, an alternative radome structure is shown which permits individual radome protection of the antenna panel 110. Below there follows a more detailed description of a specific exemplary embodiment of a radar antenna that is suitable for use in embodiments of the present invention implemented in the OCAS.

First, let us discuss the calculation of the physical size of the antenna. The radar system is assigned a frequency of around 1.3-1.5 GHz (information from KITRON 10 Sep. 2001). The wavelength is then lambda $0=c/f=22.3-23.1$ cm. This makes it possible to determine the mechanical external dimensions of the antenna. Based on an operational frequency of 1.325 GHz, the diameter of the antenna is estimated to be about 50 cm. Including a surrounding cylindrical radome, the external diameter will be about 65 cm. The height of the antenna will be determined by the number of elements per column which will be clarified in the specification phase of the development. With eight elements per column, the height of the antenna will be about 1.3 meters.

Below there follows a more detailed description of the structural design of the antenna as it is also outlined in the attached drawings. The antenna will consist of eight columns of radiating elements around a cylinder. The sub-project "Antenna" will comprise the design of the actual radiating element, active element pair and the group antenna with N elements in the vertical direction, including excitation/feed method. This will include integration of the antenna with feed line, which will be an interface with sub-project "Antenna interface". In coordination with sub-project "Antenna interface", a mechanical framework will be developed or proposed for the mounting of antenna modules and the boards which are a part of "Antenna interface". In addition, a radome will be specified both electrically and mechanically, adapted to the mechanical framework.

In what follows there is a description of structural details of an antenna element in an antenna panel for an antenna design as illustrated in the attached drawings. For eight elements in the vertical direction, the total height will be about 1.3 meters. The substrate requirement will then be about $8 \times 1.3$ m$\times 0.2$ m=2 m<2> per antenna.

The antenna itself will be a microstrip patch antenna, which we believe will give reasonable production costs due to the etching of a patch pattern. A microstrip patch antenna consists of a rectangular metal surface (=patch) that is etched out on one side of a substrate, whilst the other side of the substrate is metallized, and constitutes the patch ground plane. The patch antenna is fed via a probe that is drawn through the antenna ground plane and soldered to the patch itself.

Bandwidth requirements call for a minimum height between patch and ground plane. Preliminary calculations show that with a typical microwave substrate a substrate thickness of about 3 mm is required. This is the alternative 1 embodiment as shown for example in FIG. 12. The TLC30 substrate is regarded as a low-cost substrate for microwave frequencies and may be supplied with a one or two sided copper coating.

Alternative 2 embodiment: If FR4 material is used as a substrate for the patch antenna, a substrate thickness of about 3 mm is required. One side of the board is then metallized (copper), whilst the other side consists of patches (etched pattern), such as that illustrated in FIG. 12.

The alternative 3 embodiment is shown in the illustration in FIG. 12, where the height between the patch and the ground plane may be air. This can then be realised in the form of air-filled cavities that are punched out of a metal plate, 3 mm thick (8 per antenna, with 8 cavities in the vertical direction). The actual patches can be etched out in a board of FR4 material, which can be glued or screwed to the cavity plate. FR4 material that is 0.5 mm thick has sufficient rigidity to maintain its shape across the cavities. The cavities may be round or rectangular. In the bottom of the cavities there is another metal plate which forms the ground plane for the patches. The ground plane may either be a metal plate with holes for the feed probes or a substrate (FR4) with corresponding holes in the metal layer for feed. The substrate may then be used for feed lines if all other boards are placed in the bottom of the antenna.

Alternative 3 is a preferred embodiment of an antenna panel for an OCAS marker, as it has cavities which give more advantages in terms of electromagnetics than alternatives 1 and 2.

Below there follows a discussion of an example of an antenna interface that is suitable for the antenna discussed above. The antenna interface comprises a board and components on the signal path between the patch and the elements of the RF radar signal, as illustrated in FIG. 11. FIG. 10 shows that this consists of feed lines and switches out to each individual element from a 1:8 radial splitter. On the back of the radial splitter, we will place an active module consisting of TX/RX switches, LNA, PA and phase shifter. The signals from each of the active modules (as many modules of this kind as elements in the vertical direction) are then combined before the combined signal is passed into the radar transceiver. FIGS. 10-11 show that this is intended to be done on several boards. A FR4 substrate may be used for laying out microstrip lines 0.75 mm substrate height is preferred as this gives 50 ohm characteristic impedance at line widths of about 1.4 mm.

To make mounting and maintenance easier, the boards may be located at the bottom of the antenna. The feed lines can then be placed on the back of the FR4 substrate which functions as an ground plane for the patches as illustrated in FIG. 13.

Below there follows a description of radome solutions for protection of the antenna panels against impact from the surroundings. The radome can be integrated in a number of ways. The radome may be a large cylinder having an external diameter of about 65 cm, which is "threaded" onto the antenna. An alternative to this is to use one radome per antenna panel (8). The rest of the electronics must then be protected in another way. See FIG. 14 or 15.

In the following, features of an example framework structure for securing and positioning antenna panels are described. The framework will form a mechanical frame for the integration of antenna panels (8) and boards from the "antenna interface" and radome, as outlined for example in FIGS. 14 and 15.

To summarise, an OCAS according to the invention may comprise of a radar system connected to a central processor or processor unit, to which there is also connected warning output devices system for transmission of the warning signal. The system also includes a power supply system with an electric power generator of the solar cell type or wind generator type, and a back-up battery, and possibly also a connection to power supply from a nearby mains network. Where several OCAS are to work together in one network, systems for internal communication whereby the OCAS can exchange information about target movements within their coverage area and operational status information are included in order to establish a continuous chain of OCAS, and to ensure communication and warning beyond that which could be provided by a single marker.

An alternative embodiment of the invention will now be described. This embodiment of the invention generally relates to the use of both a radar system and a doppler anemometer to measure properties of the weather conditions and to control properties of a wind turbine in response. This embodiment may use a radar system as described above, including the OCAS but, for the avoidance of doubt, is not limited to an OCAS system, or any other radar system specifically configured to detect aircraft.

Embodiments of the present invention use a doppler anemometer such as a LIDAR (Light Detection and Ranging) device. The use of LIDAR to control operation of wind turbines is known, for example, from U.S. Pat. No. 6,320,272 of Lading et al, which teaches the use of a laser wind velocity measurement system such as a LIDAR apparatus mounted on the nacelle. Known LIDAR systems operate by emitting a laser beam in front of the wind turbine to measure the wind conditions. The distance is typically arranged to be between 0.5 and 3 rotor diameters away from the turbine, which is therefore in the order of 50 m to 450 m for a large modern wind turbine. LIDAR operates in a known manner either by detecting air molecules or by detecting particles entrained in the air stream and calculating information about the air flow from these measurements, and particularly wind speed and direction. The detection of wind speed ahead of the turbine blades allows a control system to adjust the pitch of the blades before the wind reaches the blades. Detection of wind direction ahead of the turbine blades allows a control system to adjust the yaw of the turbine before the wind reaches the blades.

In LIDAR systems coherent laser radar measures the velocity of a target as follows: a beam of coherent radiation illuminates the target, and a small fraction of the light is backscattered into a receiver. Motion of the target along the beam direction leads to a change, δv, in the light's frequency via the Doppler shift, given by:

$$|\delta v| f (2V_{LOS})/c = (2V_{LOS})/\lambda$$

where c is the speed of light ($3\times10^8$ m s−1), $V_{LOS}$ is the component of target speed along the line of sight (i.e., the beam direction), and f and λ are respectively the laser frequency and wavelength. This frequency shift is accurately measured by mixing the return signal with a portion of the original beam and picking up the beats on a photodetector at the difference frequency. The LIDAR system comprises the laser optics and detector, which are usually located within the same housing, but it is possible for these components to be separately located.

Figure 16:
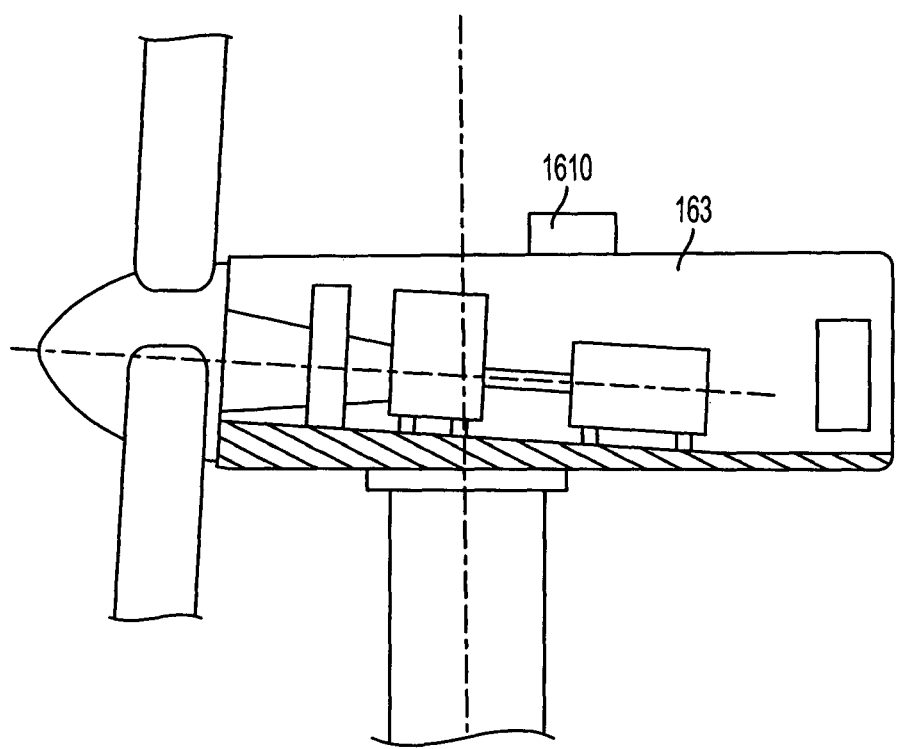
FIG. 16 is a schematic side view of a cell portion of a wind turbine incorporating a LIDAR detection unit.

FIG. 16 illustrates a schematic side view of an example of the nacelle portion of a wind turbine according to an embodiment of the present invention. Example components interior to the nacelle are shown but will not be described. Attached to the nacelle 163 is a LIDAR system or device 1610. FIG. 17 shows the components in the control system according to an embodiment of the invention. The turbine has a control unit 1712 connected to sensor equipment in the form of a LIDAR system 1710 and a radar unit 1711. The LIDAR device housed on the wind turbine nacelle 163 and radar unit can be used to measure properties of prevailing weather and particularly wind velocity. The control unit may be located in the nacelle or within the tower, or it may be separate from the turbine, with a communication link, such as a wireless connection, between the control unit, the LIDAR device, the radar unit and the yaw and pitch systems. The main controller may perform any necessary calculations, and may be distributed over multiple locations. FIG. 17 does not show the radar unit, which may comprise a radar system or OCAS system as described above or below.

The radar unit 1711 is configured to scan an area in the vicinity of the wind turbine. As described above, C and S band devices may be used as these provide medium and long range weather surveillance respectively. The radar unit may scan the surrounding area by being mounted upon a rotatable support configured to rotate the antenna continuously to provide 360° of coverage. Alternatively, a plurality of antenna panels may be used, such as in the OCAS, operation, each antenna panel covering a particular angular region to, together, give 360 degrees of coverage. Each antenna panel comprises a plurality of antenna elements 311 which are selected according to frequency, vertical coverage requirements etc.

The radar unit detects properties of the wind, such as the wind speed and direction, and may do so in the manner described above, or any manner known in the art. In particular, the radar unit provides, to the control unit, an initial profile of the weather patterns within the scanning area or volume. The control unit is configured to identify regions of abnormality, particularly turbulence, which can be performed in any manner known in the art.

The control unit is configured to identify regions of turbulence and to determine the location of the turbulence in relation to the turbine.

Figure 18:
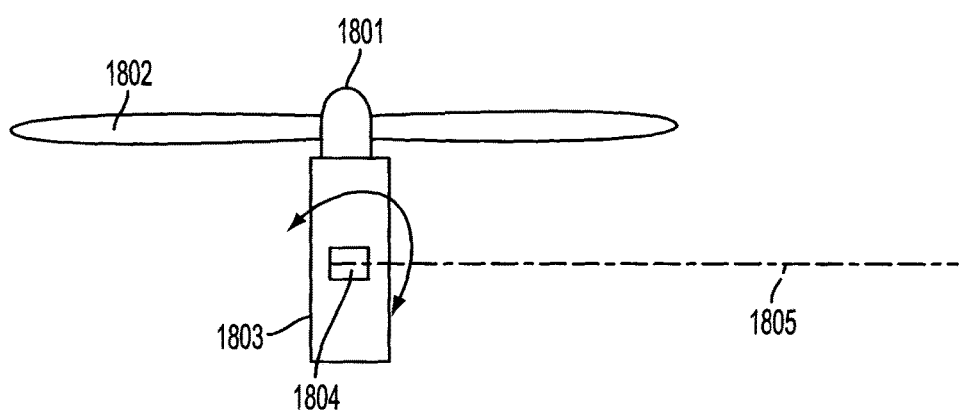
FIG. 18 is a schematic view of a turbine seen from above incorporating a rotatable LIDAR detector.
Figure 19:
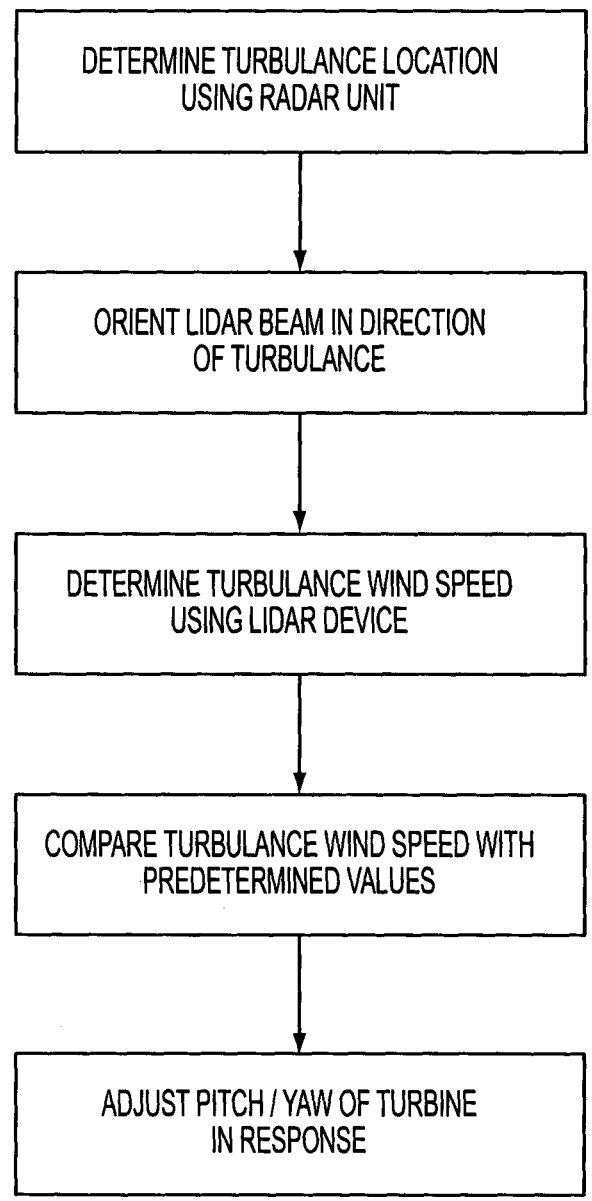
FIG. 19 shows the steps undertaken by a control unit in controlling a yaw and pitch system of a wind turbine.

The LIDAR unit, or other doppler anemometer, is mounted on the wind turbine in a manner such that the line of sight can be adjusted. An example of such a LIDAR unit is shown in FIG. 18, which shows a top down or aerial view of a wind turbine 1801 showing the rotor blades 1802 and nacelle 1803. Mounted on the nacelle is the LIDAR unit 1804 having a line of sight indicated by line 1805. The LIDAR unit is mounted on a rotating unit, coupled to the nacelle, and arranged to rotate the LIDAR unit such that the line of sight 1805 may be rotated within the horizontal plane of the wind turbine as indicated in the figure, relative to the nacelle. Alternatively, the LIDAR unit may include a rotating mirror for redirecting the beam to the desired position. The LIDAR beam preferably extends substantially parallel to the horizontal plane, being parallel to the ground/turbine base, such that the component of wind velocity measured by the LIDAR beam is the component perpendicular to the plane of the rotor.

The control unit 1712 is configured to control the LIDAR unit in response to measurements made by the radar unit. In particular, the control unit determines the location of regions of turbulence, based on the radar measurements, and controls the LIDAR unit to adjust the line of sight of the LIDAR beam to point in the direction from the turbine towards the detected turbulence. Preferably this may be achieved by rotating the LIDAR rotating unit until the LIDAR line of sight is pointing in the desired direction towards the turbulence.

In response to data collected by the radar unit and determined by the control unit to be indicative of turbulence, the control unit determines the bearing of the turbulence in relation to the wind turbine and sends a control signal to the LIDAR unit causing the LIDAR beam line of sight to be adjusted to point in the direction of the detected turbulence. The LIDAR device can then be used to perform measurements on the turbulence region to more accurately determine the properties of the turbulence. In particular, the LIDAR device is able to more accurately determine wind speed within the turbulence region, particularly the component of wind speed parallel to, or anti-parallel to the LIDAR beam.

Advantageously this allows an initial, coarse, determination of the properties of the turbulence, as well as the location of the turbulence, with the LIDAR system then providing a more detailed measurement of wind speed. This allows a relatively simple LIDAR unit to be used, requiring, for example, only a single beam rather than more complex multi-beam arrangements or other more complex arrangements that would be required to locate turbulence. Providing the two different systems is also advantageous because the radar system is able to detect turbulence at a considerably further distance than that of a LIDAR system in the measurement of wind speeds. For example, an S-band or C-band radar device may detect turbulence in the range of several kilometers whereas a LIDAR device may have an effective range of wind speed detection of a several hundred meters. The LIDAR device operates at a limited effective range as wind speeds variably evolve, and as such, wind speed measurements are typically more relevant closer to the turbine. This allows the radar unit to detect regions of turbulence in advance of these regions reaching the effective detection distance limit of the LIDAR device, providing sufficient time for the control unit to orient the LIDAR beam in the direction of the turbulence.

As shown in FIG. 17 the control unit may also be coupled to the pitch system 1713 and/or to the yaw system 1714. In response to input from the radar unit or the LIDAR unit, the control unit may control the pitch or yaw of the turbine to avoid unnecessary strain that may be caused by incoming extreme wind conditions such as turbulence.

The action to be taken by the control unit with regards to the pitch and/or yaw systems can be determined by comparing the turbulence wind speed with predetermined values. The comparison may indicate that the turbulence wind speeds exceed threshold wind speeds which could cause damage to the turbine system. In response the control unit may control the yaw system to yaw the turbine away from oncoming turbulence or control the pitch system to feather the blades and induce a stall to protect the turbine from damage.

Embodiments of the invention enable a wind turbine to detect extreme wind conditions sufficiently in advance that evasive action can be taken before the extreme conditions arrive at the wind turbine. This enables the potentially catastrophic effects of the extreme conditions to be mitigated. The control unit processes the LIDAR signals and if turbulence is detected which would result in an extreme load on the turbine, based on predetermined conditions or thresholds, the unit may output an appropriate control signal or command.

The control signals generated by the control unit in response to detection of an extreme event may comprise a yaw signal and a pitch signal as mentioned above. In addition, a power control signal may be used, for example comprising a generator shutdown command, a rotor blade pitch command, a generator power output command and/or a thrust limit command. These commands are output to the appropriate control unit to adjust the wind turbine parameters.

The power control signal developed by the control unit 1712 may cause the generator power level to be changed from its normal operating set point to a level below normal operating conditions. The power control signal sent may depend on the nature and severity of the extreme event and may include a generator shut down command in response to which the controller performs an emergency shut down. This may involve opening the generator contacts and preventing generation of power so disconnecting the generator from the network to which it is attached.

Although in some extreme events, generator shutdown is essential, it is preferred to take less drastic action if possible as the action may be reversed more quickly when signals received from the LIDAR and radar indicate that the extreme event has passed and that normal operating set points may be resumed.

Where the LIDAR detects that the turbulence is not sufficiently severe to require a total shutdown, the control unit may reduce the rotational speed of the rotor and reduce torque via a generator current demand signal, or a pitch control signal, in advance of the turbulence reaching the rotor. This has the advantage that normal operation may be resumed more quickly than if a shutdown is automatically initiated.

Although embodiments have been described in relation to detecting and mitigating for turbulence, embodiments may also use the radar and LIDAR combination to detect extreme wind speed, extreme operating gust, extreme direction change and extreme wind shear and output an appropriate control signal to adjust the wind turbine properties to avoid damage to components.

Adjusting the turbine yaw and/or pitch has the advantage of mitigating the effects of extreme wind conditions, meaning that wind turbine components such as blades do not have to be designed to withstand the full effect of the extreme wind conditions. As a result, blades and other components may be lighter, with less material, so reducing manufacturing costs. Alternatively, for a given installation, large blades may be used, enabling more energy to be extracted from the wind.

The invention claimed is:

1. A radar system for a wind turbine comprising a plurality of wind turbine blades, the radar system comprising:
a first radar unit and a control unit arranged to receive an output from the radar unit, wherein the control unit is coupled to a wind turbine pitch control system, the control unit comprising a central processing unit configured to:
perform a first function of: determining at least one property of a detected aircraft within a monitoring zone of the wind turbine based on the output of the first radar unit, controlling a warning device to output a warning signal to the detected aircraft based on the determined property, and controlling the wind turbine pitch control system to control the pitch of the wind turbine blades based on the determined property of the detected aircraft; and
perform a second function of determining at least one parameter of prevailing weather in the monitoring zone of the wind turbine based on the output of the first radar unit.

2. A radar system according to claim 1 wherein the second function includes determining a wind speed in at least one direction.

3. A radar system according to claim 1 wherein the second function includes determining a wind direction.

4. A radar system according to claim 1 wherein the first radar unit operates in the L band.

5. A radar system according to claim 1 wherein the control unit and radar unit is formed in a single field unit.

6. A radar system according to claim 1 further comprising one or more warning devices coupled to the control unit, the warning devices being one or more of a light emitting device, an audio emitting device or a radio communication device.

7. A radar system according to claim 1, wherein the control unit is configured to control the pitch of the wind turbine blades based on the determined parameter according to the second function.

8. A radar system according to claim 1 wherein controlling the pitch of the wind turbine blades comprises pitching the blades to a feathered position to shut down the wind turbine.

9. A radar system according to claim 1 wherein the control unit is coupled to a wind turbine yaw control system, the control unit being configured to control a yaw of the wind turbine blades based on at least one of the determined property of the detected aircraft or the determined parameter according to the second function.

10. A radar system according to claim 1, the first function further comprising:
    determining whether the detected aircraft has a course and height that may result in the detected aircraft colliding with the wind turbine if the course and height are maintained, wherein a first warning signal is provided to the detected aircraft when the detected aircraft enters a first warning zone within the monitoring zone and a second warning signal is provided to the detected aircraft when the detected aircraft enters a second warning zone within the monitoring zone.

11. A radar system according to claim 1, the first function further comprising:
    determining whether the detected aircraft has a course and height that may result in the detected aircraft colliding with the wind turbine if the course and height are maintained, wherein a warning signal is provided to the detected aircraft when the detected aircraft enters a warning zone within the monitor zone, and wherein no new warning signal will be provided when an aircraft speed is below a predetermined threshold value and the detected aircraft is inside the warning zone for longer than a predetermined time.

12. A radar system according to claim 1, further including a radar antenna having a plurality of antenna elements in communication with the central processing unit of the control unit, wherein the radar antenna is in communication with radar electronics to form part of the radar system for radar detection of aircraft in a radar coverage area, wherein the plurality of antenna elements provide 360 degree radar coverage area within the monitoring zone of the wind turbine.

13. A radar system according to claim 1, wherein the control unit is configured to provide a first warning signal by controlling a light system and to provide a second warning signal by controlling a radio transmitter system.

14. A radar system according to claim 13, wherein the light system and radio transmitter system are configured to be in a sleep mode until activated by the control unit.

15. A radar system according to claim 1, further comprising:
    a light system connected to and controlled by the central processing unit for providing a light warning signal, the light system being activated by the central processing unit upon detection of the detected aircraft in a first warning zone; and
    a radio transmitter system connected to and controlled by the central processing unit for providing a radio frequency audible warning signal, the radio transmitter system being activated by the central processing unit upon the detection of the detected aircraft in a second warning zone.

16. A radar system according to claim 1, wherein the system is formed in a first field unit of a plurality of field units having respective coverage areas, wherein the plurality of field units are configured to exchange information about aircraft movements within the respective coverage areas.

17. A method of operating a radar system of a wind turbine comprising a plurality of wind turbine blades, the method comprising:
    providing a first radar unit and a control unit arranged to receive an output from the radar unit, the control unit comprising a central processing unit, and wherein the control unit is coupled to a wind turbine pitch control system;
    determining at least one property of a detected aircraft within a monitoring zone of the wind turbine based on the output of the first radar unit;
    controlling a warning device to output a warning signal to the detected aircraft based on the determined property;
    controlling the wind turbine pitch control system to control the pitch of the wind turbine blades based on the determined property of the detected aircraft; and
    determining at least one parameter of prevailing weather in the vicinity monitoring zone of the wind turbine using the output of the first radar unit.

18. A method according to claim 17 wherein the parameter of the prevailing weather is at least one of a wind speed in at least one direction or a wind direction.

19. A method according to claim 17 wherein controlling the pitch of the wind turbine blades includes pitching the wind turbine blades to a feathered position to shut down the wind turbine.

20. A method according to claim 17 wherein the control unit is coupled to a wind turbine yaw control system, the method further comprising controlling a yaw of the wind turbine blades based on at least one of the determined property of the detected aircraft or based on the determined parameter of the prevailing weather.

21. A method according to claim 17 further comprising:
    determining whether the detected aircraft in a coverage area of the monitoring zone has a course and height that may result in the detected aircraft colliding with the wind turbine if the course and height are maintained;
    calculating first and second warning zones based on the course and height;
    providing a first warning to the detected aircraft, when the detected aircraft enters the first warning zone;
    providing a second warning to the detected aircraft, when the detected aircraft enters the second warning zone.

22. A method according to claim 17 further comprising:
    detecting when the detected aircraft has entered the coverage area;
    determining information about the detected aircraft including speed, direction, and height of the aircraft;
    calculating at least a first warning zone based on the information;
    providing a first warning to the detected aircraft, when the detected aircraft enters the first warning zone; and
    desisting from providing warnings to the detected aircraft, when the detected aircraft remains inside the first warning zone for a predetermined period to time.

* * * * *